UNITED STATES PATENT OFFICE.

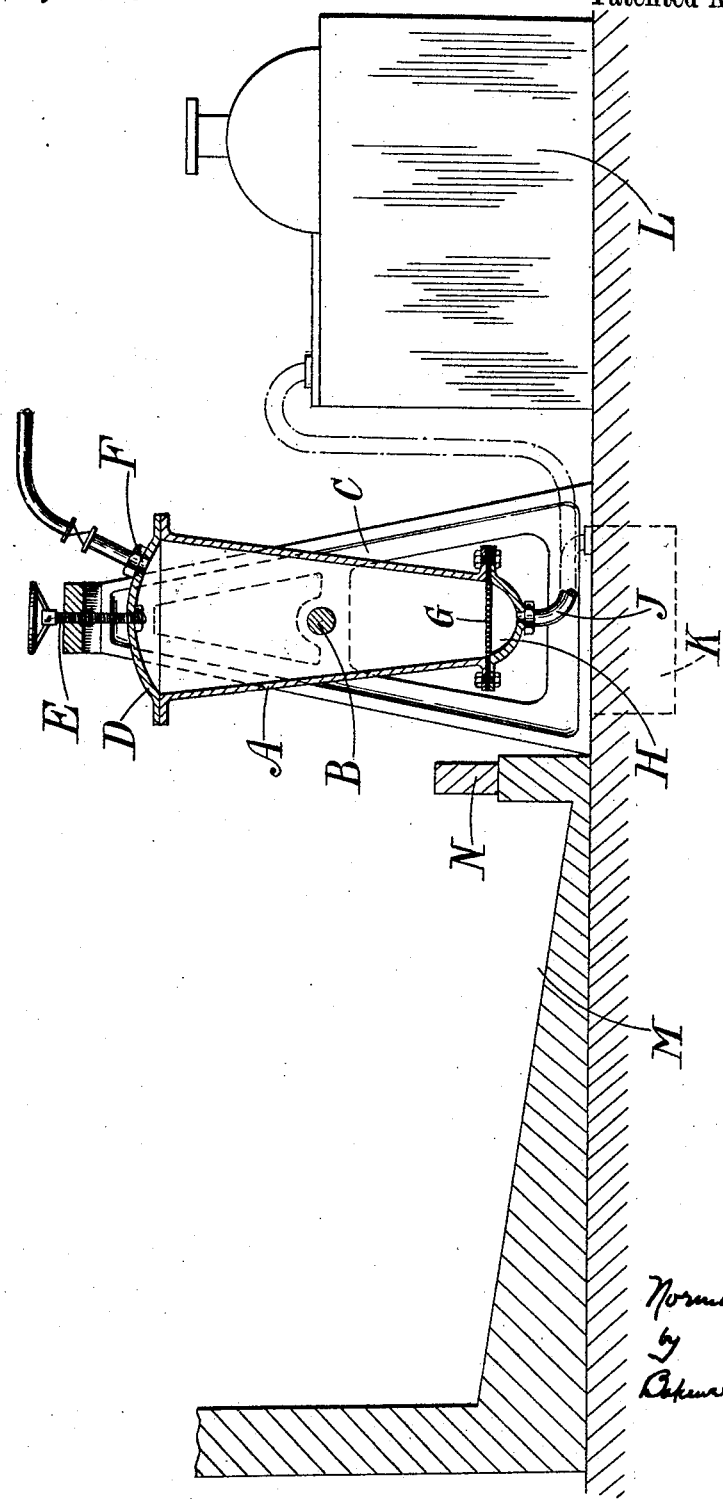

NORMAN WILTON, OF LONDON, ENGLAND.

PURIFICATION OF CRUDE AMMONIUM SULPHATE.

1,412,549.  Specification of Letters Patent.  Patented Apr. 11, 1922.

Application filed August 9, 1920. Serial No. 402,345.

*To all whom it may concern:*

Be it known that I, NORMAN WILTON, subject of the King of England, residing at Hendon, London, England, have invented certain new and useful Improvements in Purification of Crude Ammonium Sulphate, of which the following is a specification.

This invention lies in improvements in or relating to the manufacture of ammonium sulphate.

Ammonium sulphate is normally produced by the absorption of ammonia in sulphuric acid.

Ammonium sulphate is thrown down, but it is a difficult problem to separate the mother liquor therefrom. It has been customary to effect this separation either in centrifugal machines, or by heaping up the wet precipitate in lead-lined chambers, from which the liquor was drained. The objection to this latter course is that the precipitate cakes and becomes very hard. The object of this invention is to provide a rapid and economical method of separating the mother liquor from wet ammonium sulphate precipitate.

According to this invention wet ammonium sulphate is introduced into a vessel having a perforated bottom, or false bottom, which is substantially closed at the top, whereupon dry steam or a mixture of steam and air is blown into the upper part of the vessel so as to displace the liquid from the ammonium sulphate and leave the latter in a substantially dry state.

In certain cases it may be desired to neutralise free acid in the wet precipitate, and a further feature of this invention consists in the fact that after the preliminary drying process ammonia may be introduced alone or with steam into the separating vessel.

The accompanying drawing is a diagrammatic elevation illustrating, by way of example, one form of apparatus suitable for carrying this invention into effect.

The apparatus comprises an upright keir or vessel A. It is here shown of conical form tapering downward, but it may be cylindrical or of other suitable shape. It is mounted on horizontal trunnions B in a supporting framework C. At the upper end of the vessel A is a lid or cover D, which may be lifted and lowered by a screw E engaging a corresponding tapped member at the top of the framework C. The use of a removable cover affords means by which the wet ammonium sulphate is introduced into the vessel. Alternatively, the cover may be provided with a valve-controlled inlet for the wet ammonium sulphate. The cover D is provided with an inlet F (preferably valve-controlled) for the steam. At the bottom of the vessel there is a perforated plate G which may be removed. Below the perforated plate G the vessel is closed, leaving a chamber H for the reception of the liquor discharged from the precipitate, and an outlet pipe J from the bottom of the chamber H may lead either to a tank K, or back to the saturator L, from which the wet ammonium sulphate was obtained. A storage chamber M for the purified dry sulphate of ammonia is provided with a wall N arranged near the vessel A, so that the ammonium sulphate may be tipped directly out of the vessel A into the chamber M. In order to ensure that there is no condensation of steam on the sulphate, the vessel may be steam-jacketed.

The operation of this apparatus is as follows:—

The lid of the vessel A having been removed, the vessel is tilted over on its trunnions until the top is close to the saturator L, and the wet ammonium sulphate from the saturator is scooped or otherwise conveyed into the vessel A, which is then turned back to the upright position, and the lid is screwed down on the vessel. Dry steam, say at a pressure of 70-80 lbs. per square inch, with or without admixture of air, is blown into the vessel through the inlet F, whereby the mother liquor is removed from the precipitate. This mother liquor, passing through the perforated or gauze plate G into the bottom chamber H, is led either into the tank K or back into the saturator L. This operation leaves the sulphate nearly commercially dried and containing less free acid than is usual in ammonium sulphate. For example, in a recent test the amount of free acid was reduced to 0.09% by weight by the use of steam alone, whereas ammonium sulphate dried in a centrifugal machine or drained in a heap may contain 0.3 to 0.5% of free acid.

At any suitable stage ammonia may be introduced, either alone or in admixture with steam, to neutralise acid remaining in the ammonium sulphate. Preferably steam or steam and air are introduced first, as described above, and thereafter, to complete the neutralising, the ammonia is introduced with or without steam. Conveniently, the ammonia may be derived from the ammonia still (which supplies the ammonia to the saturator). The ammonia may be drawn from a point in the still where the strongest ammonia is available without noxious gases, the bulk of which are liberated in the top sections of an ammonia still. The suitable point in an ordinary still is found just above the liming chamber, but this varies in different types of stills. The ammonia and steam from the still are led to the inlet F of the vessel A, and pass through the ammonium sulphate. The chemical reaction between the ammonia and any residual acid causes an increase in temperature, which may assist in the drying of the ammonium sulphate. Instead of using ammonia from a still, if desired pure ammonia from a generator may be used, as in my previous Patent No. 127398.

After the neutralizing operation a further amount of steam, or super-heated steam, or steam and air, may be passed through the sulphate so as to obtain it in as dry a condition as required.

When the precipitate is dry, the cover D is removed, and the vessel A is turned on its trunnions until it comes in contact with the wall N, and if desired a little steam may be introduced on the under side of the perforated plate G to assist the discharge, or the sulphate may be tipped out or raked out.

Alternatively, the lower part of the vessel H, i. e. from the false bottom G downward, may be hinged and movable to allow of the discharge of the dry precipitate from the bottom of the vessel. In either case the vessel may be made of acid-resisting material, or may be lined with acid-resisting material. Alternatively again an inner casing containing the sulphate may be withdrawn and emptied into the store.

This method and apparatus provide a simple, inexpensive means of rapidly effecting the desired separation in cases where it is impracticable to employ centrifugal machines.

It has previously been proposed for the extraction of liquid from solid materials to make use of a closed vessel having a perforated bottom leading to a conduit to carry away the liquid and an inlet for steam or compressed air and I make no claim to the general use of such apparatus. It has likewise been proposed directly to neutralise crude ammonium sulphate by passing therethrough ammonia gas, but it is to be understood that, according to the present invention, gaseous ammonia is used in conjunction with and supplementary to the process set forth of separating the liquor from the crude salt.

I claim—

1. The process for the purification of crude ammonium sulphate which comprises forcing dry steam through the material, substantially as described.

2. The process for the purification of crude ammonium sulphate which comprises forcing dry steam and ammonia through the material, substantially as described.

3. The process for the purification of crude ammonium sulphate which comprises forcing dry steam and then gaseous ammonia through the material, substantially as described.

4. The process for the purification of crude ammonium sulphate which comprises forcing dry steam, then gaseous ammonia, and finally dry steam, through the material, substantially as described.

In testimony whereof I have signed my name to this specification.

NORMAN WILTON.